(12) United States Patent
Werries et al.

(10) Patent No.: US 9,970,262 B2
(45) Date of Patent: May 15, 2018

(54) DOWNHOLE VALVE APPARATUS

(71) Applicant: NCS MULTISTAGE INC., Calgary (CA)

(72) Inventors: Michael John Werries, Calgary (CA); John Edward Ravensbergen, Calgary (CA); Don Getzlaf, Calgary (CA); Doug Brunskill, Calgary (CA)

(73) Assignee: NCS Multistage Inc., Calgary (CA)

( * ) Notice: Subject to any disclaimer, the term of this patent is extended or adjusted under 35 U.S.C. 154(b) by 148 days.

(21) Appl. No.: 14/867,753

(22) Filed: Sep. 28, 2015

(65) Prior Publication Data

US 2016/0090814 A1    Mar. 31, 2016

Related U.S. Application Data

(60) Provisional application No. 62/056,052, filed on Sep. 26, 2014.

(51) Int. Cl.
*E21B 34/06* (2006.01)
*F16K 27/04* (2006.01)
(Continued)

(52) U.S. Cl.
CPC .............. *E21B 34/12* (2013.01); *E21B 34/06* (2013.01); *F16K 27/04* (2013.01); *E21B 2034/007* (2013.01)

(58) Field of Classification Search
CPC .. E21B 2034/007; E21B 34/06; E21B 34/063; F16K 27/041; F16K 27/044
See application file for complete search history.

(56) References Cited

U.S. PATENT DOCUMENTS 1,793,193 A * 2/1931 Price .................. E21B 34/06
                                                137/155
2,249,511 A * 7/1941 Westall ............... E21B 33/146
                                                166/154
(Continued)

FOREIGN PATENT DOCUMENTS

EP       2878763 A1    6/2015
WO    2009115829 A2    9/2009
WO    2013130015 A2    9/2013

OTHER PUBLICATIONS

WIPO, International Search Report and Written Opinion for PCT International Application No. PCT/CA2015/000507 dated Dec. 14, 2015.

*Primary Examiner* — Cathleen R Hutchins
(74) *Attorney, Agent, or Firm* — Ridout & Maybee LLP

(57) ABSTRACT

There is provided a valve apparatus for disposition within a wellbore that is disposed within a subterranean formation, wherein the valve apparatus includes a housing including: (a) an outermost surface, (b) a fluid passage defined within the housing, (c) a port extending through the housing for effecting fluid communication between the reservoir and the fluid passage, (d) a first groove disposed on the outermost surface and defining a first fluid channel, for conducting reservoir fluid to the port, and extending from an outermost surface portion of the outermost surface to the port, wherein the minimum distance between the outermost surface portion and the port is at least two (2) inches, and a closure member displaceable relative to the port for effecting opening and closing of the port.

36 Claims, 3 Drawing Sheets

(51) Int. Cl.
*E21B 34/12* (2006.01)
*E21B 34/00* (2006.01)

(56) References Cited

U.S. PATENT DOCUMENTS

| | | | | |
|---|---|---|---|---|
| 4,494,608 A | * | 1/1985 | Williams | ................ E21B 23/08 |
| | | | | 137/70 |
| 5,183,114 A | | 2/1993 | Mashaw, Jr. et al. | |
| 2003/0145992 A1 | | 8/2003 | Corre et al. | |
| 2007/0012458 A1 | | 1/2007 | Jackson | |
| 2014/0345949 A1 | * | 11/2014 | Cramer | .................. E21B 34/10 |
| | | | | 175/214 |
| 2015/0211316 A1 | * | 7/2015 | Skjeie | .................... E21B 27/04 |
| | | | | 166/99 |

* cited by examiner

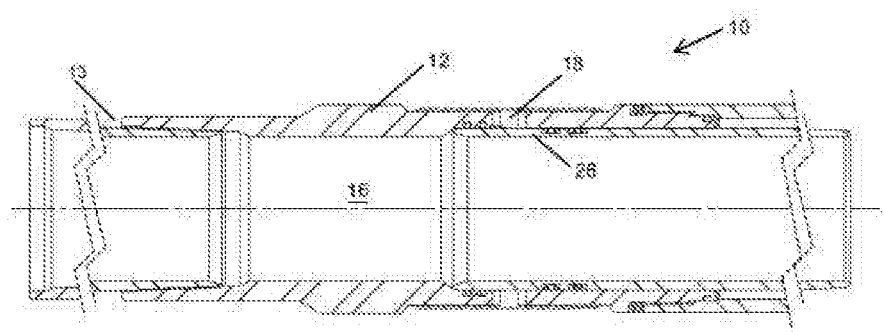
Fig. 3
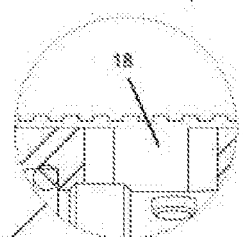
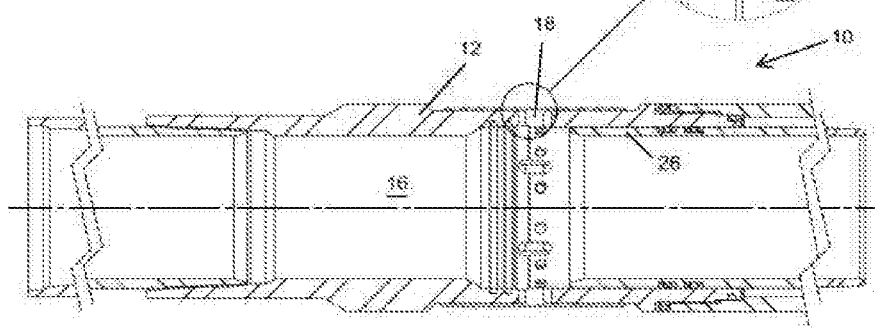
Fig. 4

DOWNHOLE VALVE APPARATUS

RELATED APPLICATION

This application claims priority from U.S. Provisional Patent Application Ser. No. 62/056,052, filed on Sep. 26, 2014.

FIELD

The present disclosure relates to a valve apparatus for use downhole within a wellbore for facilitating production of hydrocarbons from a reservoir.

BACKGROUND

Wellbore completions include ports that are configured for receiving hydrocarbons from a reservoir in order to effect production of the reservoir. In reservoirs where hydraulic treatment, such as by hydraulic fracturing, is used in order to render the reservoir producible, production may only be enabled if the fracture within the reservoir extends to the port. If the fracture does not extend to the port, it is difficult to effect production of those hydrocarbons within the fracture.

SUMMARY

In one aspect, there is provided there is provided a valve apparatus for disposition within a wellbore that is disposed within a subterranean formation, wherein the valve apparatus includes a housing including: (a) an outermost surface, (b) a fluid passage defined within the housing, (c) a port extending through the housing for effecting fluid communication between the reservoir and the fluid passage, (d) a first groove disposed on the outermost surface and defining a first fluid channel, for conducting reservoir fluid to the port, and extending from an outermost surface portion of the outermost surface to the port, wherein the minimum distance between the outermost surface portion and the port is at least two (2) inches, and a closure member displaceable relative to the port for effecting opening and closing of the port.

In another aspect, a valve apparatus for disposition within a wellbore that is disposed within a subterranean formation, the apparatus comprising: a housing including (a) an outermost surface, (b) a fluid passage defined within the housing, (c) a port extending through the housing for effecting fluid communication between the reservoir and the fluid passage, and (d) a first fluid channel defined by a groove disposed on the outermost surface, the first fluid channel extending from an outermost surface portion of the outermost surface to the port, and a closure member, displaceable relative to the port, for effecting opening and closing of the port, wherein the housing includes a cross-section taken at the port, and a perimeter of the housing is defined along the outermost surface of the housing disposed along the cross-section, and the outermost surface portion, from which the first fluid channel extends, is disposed along the perimeter and is spaced apart from the port by a perimetral distance that is at least about 25% of the distance about the entire perimeter.

BRIEF DESCRIPTION OF DRAWINGS

The preferred embodiments will now be described with the following accompanying drawings, in which:

FIG. 3 is a sectional elevation view of the valve apparatus in FIG. 1, illustrating the port in a closed condition; and FIG. 4 is a sectional elevation view of the valve apparatus in FIG. 1, illustrating the port in an open condition.

DETAILED DESCRIPTION

Referring to FIGS. 1 to 4, there is provided a valve apparatus 10 for use within a wellbore that is disposed within a subterranean formation and intersecting a hydrocarbon reservoir.

The valve apparatus 10 may be incorporated within a wellbore string. In some embodiments, for example, the wellbore string includes a casing string 13 that is cemented to the subterranean formation. In this respect, in some embodiments, for example, the valve apparatus 10 may be a sub, a collar, a tubular, a casing joint, or a casing section.

Figure 1:
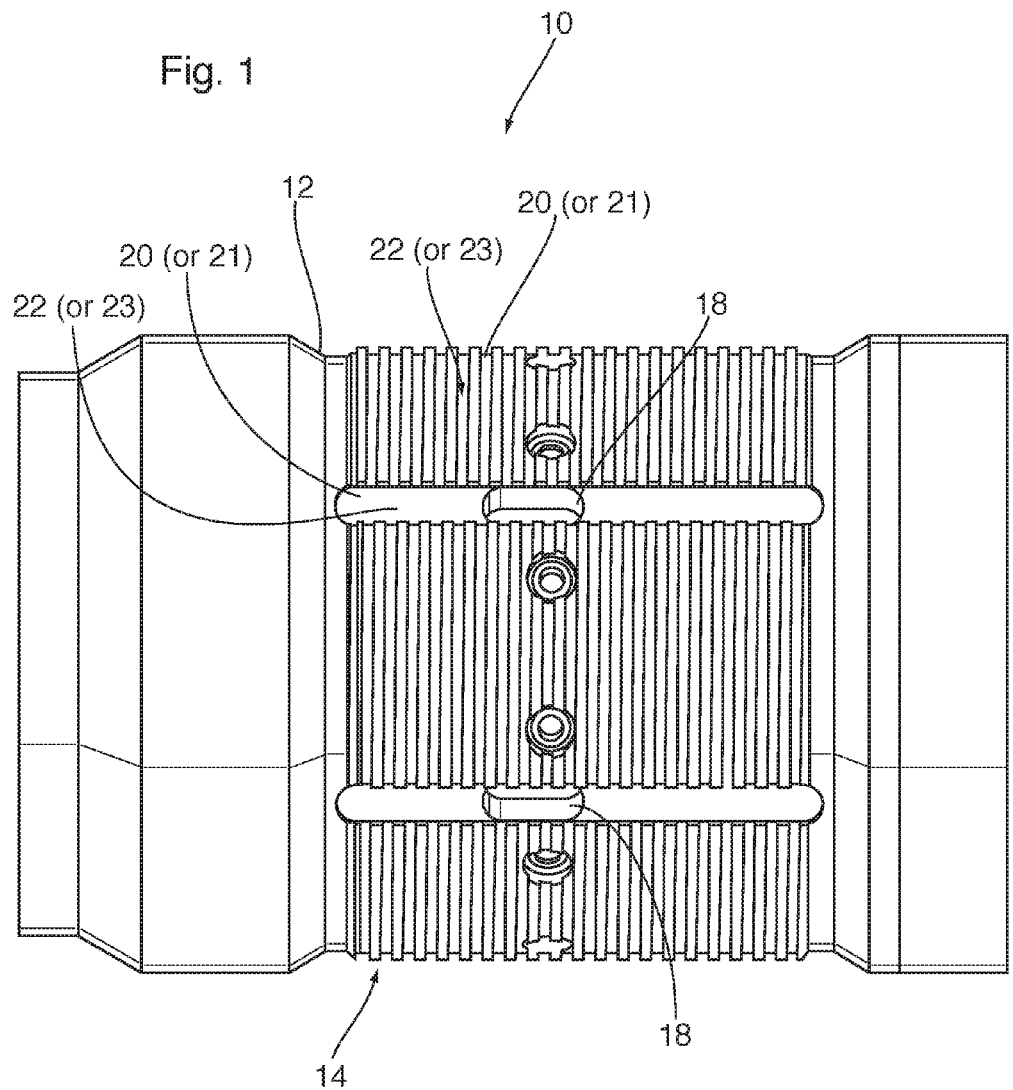
FIG. 1 is a front elevation view of the valve apparatus.

Referring to FIG. 1, the valve apparatus 10 includes a housing 12. The housing 12 includes an outermost surface 14, a fluid passage 16, a port 18, and a groove 20.

The fluid passage 16 is defined with the housing 12 and is configured to conduct fluid being supplied to the port 18 from the surface (such as treatment fluid), as well reservoir fluid being produced from the reservoir.

The port 18 extends through the housing 12 for effecting fluid communication between the reservoir and the fluid passage 16.

The groove 20 is disposed on the outermost surface 14 and define a first fluid channel 22 extending from an outermost surface portion 24 of the outermost surface 14 to the port 18 provided in the valve apparatus 10. Such fluid channel 22 may facilitate fluid communication between fractures that are naturally present, or have been artificially created by hydraulically fracturing a reservoir, and the port 18, so that hydrocarbons within the fracture can be conducted to the port 18. Without such fluid channel 22, it may be more difficult to produce hydrocarbons disposed within fractures that do not perfectly intersect the port 18.

The valve apparatus further includes a closure member 26 that is displaceable relative to the housing 12 for effecting opening and closing of the port 18.

In one aspect, the minimum distance between the outermost surface portion 24 and the port 18 is at least two (2) inches.

Figure 2:
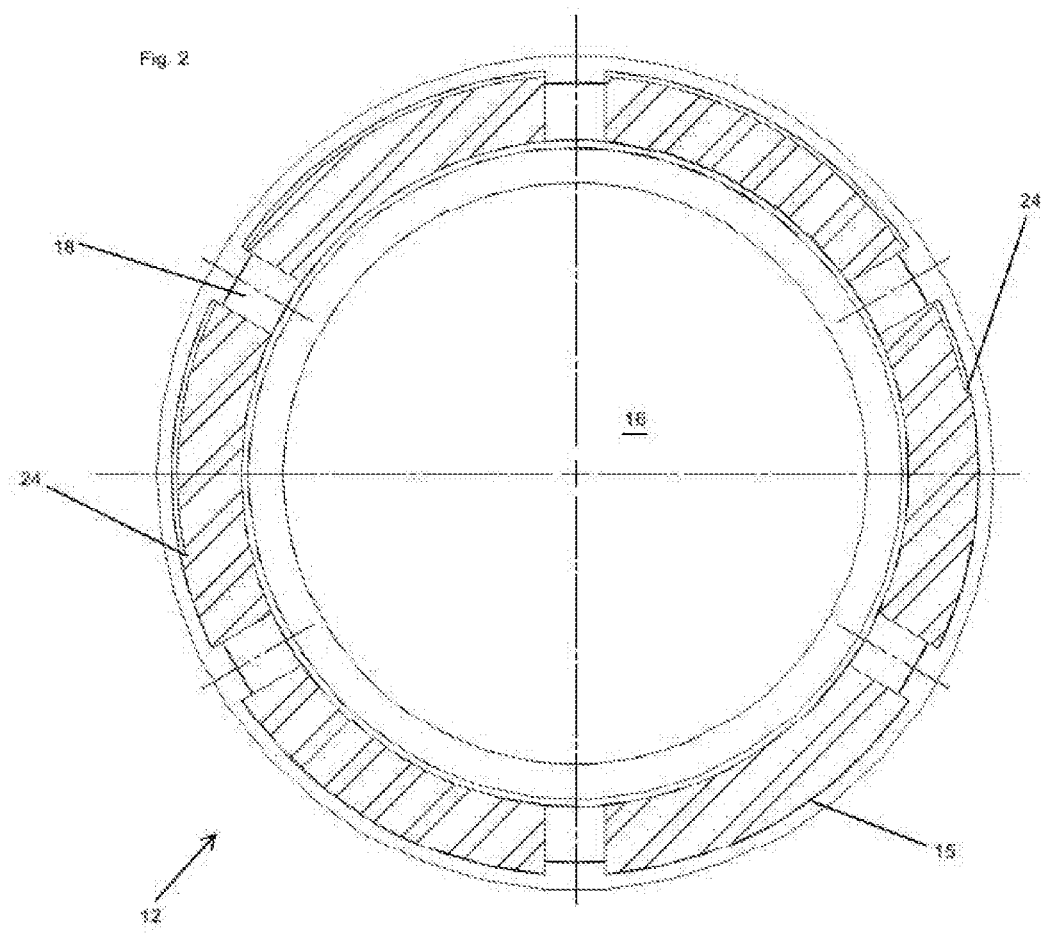
FIG. 2 is a cross-sectional view of the housing of the valve apparatus of FIG. 1, taken at the port, and illustrating a perimeter of the housing defined along the outermost surface of the housing disposed along the cross-section, and further illustrating the disposition of the outermost surface portion along the perimeter and in spaced apart relationship relative to the port by a perimetral distance that is at least about 25% of the distance about the entire perimeter.

In another aspect, and referring to FIG. 2, the housing 12 includes a cross-section taken at the port, and a perimeter 15 of the housing 12 is defined along the outermost surface 14 of the housing 12 disposed along the cross-section, and the outermost surface portion 24 (from which the first groove 20 extends) is disposed along the perimeter 15 and is spaced apart from the port 18 by a perimetral distance that is at least about 25% of the distance about the entire perimeter 15. In some embodiments, for example, the perimetral distance is at least about 50% of the distance about the entire perimeter. In some embodiments, for example, the perimetral distance is at least about 75% of the distance about the entire perimeter. In some embodiments, for example, the perimetral distance is the distance about the entire, or substantially the entire, perimeter.

In some embodiments, for example, the first groove is machined into the outermost surface 14.

In some embodiments, for example, the first groove 20 is disposed circumferentially about the outermost surface 14.

In some embodiments, for example, the first groove is helical or substantially helical.

In some embodiments, for example, the first groove 20 is characterized by a minimum depth of at least 0.125 inches, such as, for example, at least 0.3 inches.

In some embodiments, for example, the first groove 20 is characterized by a minimum cross-sectional area per inch of at least 0.15 square inches per inch.

In some embodiments, for example, the first groove 20 is characterized by a minimum depth of at least 0.3 inches, a minimum width of at least 0.125 inches, and at least four (4) threads per inch.

In some embodiments, for example, the axis of the first fluid channel 22 diverges from the axis of the housing fluid passage 16.

In some embodiments, for example, the closure member 26 is disposed within and coupled to the housing 12.

In some embodiments, for example, the closure member 26 includes a sleeve.

In some embodiments, for example, the housing 12 further includes a second groove 21 defining a second fluid channel 23, wherein the second groove 21 intersects the first groove 20. In some of these embodiments, for example, the second fluid channel 23 has an axis, and the length of the axis is at least two (2) inches.

In some embodiments, for example, the first and second grooves 20, 21 are disposed on a region of the outermost surface 14 that is recessed into the housing 10. This recessed region is provided so as to mitigate the risk of cement retarder, which may be applied to this region, from being removed while the valve apparatus 10 is being deployed downhole.

In some embodiments, for example, a wellbore string is provided including a casing string including any one of the embodiments of the valve apparatus 10 described above. In some embodiments, for example, the wellbore string is disposed within a wellbore. In some embodiments, for example, the casing string is cemented to the subterranean formation.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A valve apparatus for disposition within a wellbore that is disposed within a subterranean formation and intersects a hydrocarbon reservoir, the apparatus comprising:
   a housing including:
   (a) an outermost surface;
   (b) a fluid passage defined within the housing;
   (c) at least one port extending through the housing for effecting fluid communication between the reservoir and the fluid passage;
   (d) a first groove disposed on the outermost surface and defining a first fluid channel, for conducting reservoir fluid to the at least one port, and extending to the at least one port from a point disposed along the perimeter of the outermost surface that is spaced from the at least one port;
   wherein the first groove is helical or substantially helical and the minimum distance between the point disposed along the perimeter of the outermost surface from which the first groove extends and the at least one port is at least two (2) inches;
   and
   a closure member displaceable relative to the at least one port for effecting opening and closing of the at least one port;
   wherein the housing includes a cross-section taken at the at least one port, and a perimeter of the housing is defined along the outermost surface of the housing disposed along the cross-section, and the point disposed along the perimeter of the outermost surface from which the first groove extends is spaced apart from the at least one port by a perimetral distance that is at least about 50% of the distance about the entire perimeter.

2. The valve apparatus as claimed in claim 1;
   wherein the first groove is machined into the outermost surface.

3. The valve apparatus as claimed in claim 1;
   wherein the first groove is disposed circumferentially about the outermost surface.

4. The valve apparatus as claimed in claim 1;
   wherein the perimetral distance is at least about 75% of the distance about the entire perimeter.

5. The valve apparatus as claimed in claim 1, wherein the housing further includes:
   a second groove disposed on the outermost surface and defining a second fluid channel, wherein the second fluid channel intersects the first fluid channel.

6. The valve apparatus as claimed in claim 5;
   wherein the second fluid channel has an axis, and the length of the axis is at least two (2) inches.

7. The valve apparatus as claimed in claim 1;
   wherein the first groove is characterized by a minimum depth of at least 0.125 inches.

8. The valve apparatus as claimed in claim 1;
   wherein the first groove is characterized by a minimum cross-sectional area per inch of at least 0.15 square inches per inch.

9. The valve apparatus as claimed in claim 1;
   wherein the first groove is characterized by a minimum depth of at least 0.3 inches, a minimum width of at least 0.125 inches, and at least four (4) threads per inch.

10. A wellbore string including the valve apparatus as claimed in claim 1.

11. The wellbore string as claimed in claim 10 disposed within a wellbore.

12. The wellbore string as claimed in claim 11, wherein the wellbore string includes a casing string that is cemented to the subterranean formation.

13. A valve apparatus for disposition within a wellbore that is disposed within a subterranean formation, the apparatus comprising:
   a housing including:
   (a) an outermost surface;
   (b) a fluid passage defined within the housing;

(c) at least one port extending through the housing for effecting fluid communication between the reservoir and the fluid passage;
(d) a first fluid channel defined by a groove disposed on the outermost surface, the first fluid channel extending to the at least one port from a point disposed along the perimeter of the outermost surface that is spaced from the at least one port;
(e) a second groove disposed on the outermost surface and defining a second fluid channel, wherein the second fluid channel intersects the first fluid channel and fluidly interconnects the first fluid channel and the at least one port;
and
a closure member, displaceable relative to the at least one port, for effecting opening and closing of the at least one port;
wherein the housing includes a cross-section taken at the port, and a perimeter of the housing is defined along the outermost surface of the housing disposed along the cross-section, and the outermost surface portion, from which the first fluid channel extends, is disposed along the perimeter and is spaced apart from the port by a perimetral distance that is at least about 50% of the distance about the entire perimeter.

14. The valve apparatus as claimed in claim 13;
wherein the perimetral distance is at least about 75% of the distance about the entire perimeter.

15. The valve apparatus as claimed in claim 13;
wherein the groove is machined into the outermost surface.

16. The valve apparatus as claimed in claim 13;
wherein the groove is characterized by a minimum depth of at least 0.125 inches.

17. The valve apparatus as claimed in claim 13;
wherein the groove is characterized by a minimum cross-sectional area per inch of at least 0.15 square inches per inch.

18. The valve apparatus as claimed in claim 13;
wherein the groove is characterized by a minimum depth of at least 0.3 inches, a minimum width of at least 0.125 inches, and at least four (4) threads per inch.

19. A wellbore string including the valve apparatus as claimed in claim 13.

20. The wellbore string as claimed in claim 19 disposed within a wellbore.

21. The wellbore string as claimed in claim 20, wherein the wellbore string includes a casing string that is cemented to the subterranean formation.

22. A valve apparatus for disposition within a wellbore that is disposed within a subterranean formation and intersects a hydrocarbon reservoir, the apparatus comprising:
a housing including:
(a) an outermost surface;
(b) a fluid passage defined within the housing;
(c) at least one port extending through the housing for effecting fluid communication between the reservoir and the fluid passage;
(d) a first groove disposed on the outermost surface and defining a first fluid channel, for conducting reservoir fluid to the at least one port, and extending to the at least one port from a point disposed along the perimeter of the outermost surface that is spaced from the at least one port;
wherein the first groove is helical or substantially helical and the minimum distance between the point disposed along the perimeter of the outermost surface from which the first groove extends and the at least one port is at least two (2) inches; and
a closure member displaceable relative to the at least one port for effecting opening and closing of the at least one port;
wherein the first groove is characterized by a minimum depth of at least 0.3 inches, a minimum width of at least 0.125 inches, and at least four (4) threads per inch.

23. The valve apparatus as claimed in claim 22;
wherein the first groove is machined into the outermost surface.

24. The valve apparatus as claimed in claim 22;
wherein the first groove is disposed circumferentially about the outermost surface.

25. The valve apparatus as claimed in claim 22, wherein the housing further includes:
a second groove disposed on the outermost surface and defining a second fluid channel, wherein the second fluid channel intersects the first fluid channel.

26. The valve apparatus as claimed in claim 25;
wherein the second fluid channel has an axis, and the length of the axis is at least two (2) inches.

27. The valve apparatus as claimed in claim 22;
wherein the first groove is characterized by a minimum cross-sectional area per inch of at least 0.15 square inches per inch.

28. A wellbore string including the valve apparatus as claimed in claim 22.

29. The wellbore string as claimed in claim 28 disposed within a wellbore.

30. The wellbore string as claimed in claim 29, wherein the wellbore string includes a casing string that is cemented to the subterranean formation.

31. A valve apparatus for disposition within a wellbore that is disposed within a subterranean formation, the apparatus comprising:
a housing including:
(a) an outermost surface;
(b) a fluid passage defined within the housing;
(c) at least one port extending through the housing for effecting fluid communication between the reservoir and the fluid passage;
(d) a first fluid channel defined by a groove disposed on the outermost surface, the first fluid channel extending to the at least one port from a point disposed along the perimeter of the outermost surface that is spaced from the at least one port;
(e) a second groove disposed on the outermost surface and defining a second fluid channel, wherein the second fluid channel intersects the first fluid channel and fluidly interconnects the first fluid channel and the at least one port;
and
a closure member, displaceable relative to the at least one port, for effecting opening and closing of the at least one port;
wherein the groove is characterized by a minimum depth of at least 0.3 inches, a minimum width of at least 0.125 inches, and at least four (4) threads per inch.

32. The valve apparatus as claimed in claim 31;
wherein the groove is machined into the outermost surface.

33. The valve apparatus as claimed in claim 31;
wherein the groove is characterized by a minimum cross-sectional area per inch of at least 0.15 square inches per inch.

34. A wellbore string including the valve apparatus as claimed in claim 31.

35. The wellbore string as claimed in claim 34 disposed within a wellbore.

36. The wellbore string as claimed in claim 35, wherein the wellbore string includes a casing string that is cemented to the subterranean formation.

* * * * *